(12) United States Patent
Jiang

(10) Patent No.: US 9,394,895 B2
(45) Date of Patent: Jul. 19, 2016

(54) MULTI-RANGE ON-SITE FULL-AUTOMATIC PRESSURE CALIBRATION INSTRUMENT

(71) Applicant: BEIJING CONST INSTRUMENT TECHNOLOGY INC., Beijing (CN)

(72) Inventor: Weili Jiang, Beijing (CN)

(73) Assignee: BEIJING CONST INSTRUMENT TECHNOLOGY INC., Beijing (CN)

( * ) Notice: Subject to any disclaimer, the term of this patent is extended or adjusted under 35 U.S.C. 154(b) by 0 days.

(21) Appl. No.: 14/806,235

(22) Filed: Jul. 22, 2015

(65) Prior Publication Data

US 2015/0323409 A1 Nov. 12, 2015

Related U.S. Application Data

(63) Continuation of application No. 14/122,087, filed as application No. PCT/CN2011/001232 on Jul. 27, 2011.

(30) Foreign Application Priority Data

May 26, 2011 (CN) .......................... 2011 1 0139064

(51) Int. Cl.
*F04B 35/04* (2006.01)
*G01L 27/00* (2006.01)
(Continued)

(52) U.S. Cl.
CPC ................ *F04B 35/04* (2013.01); *F04B 19/006* (2013.01); *F04B 39/00* (2013.01); *F04B 39/0005* (2013.01); *F04B 39/0094* (2013.01); *G01L 27/005* (2013.01)

(58) Field of Classification Search
CPC ............ G01M 3/3272; G05D 16/2013; G05D 16/208; H01J 37/32449; H01J 37/32935; G01L 27/005; G01L 27/00; G01L 27/002; G01L 27/007; G01L 27/02
See application file for complete search history.

(56) References Cited

U.S. PATENT DOCUMENTS

| 4,658,829 A | * | 4/1987 | Wallace | ............. | A61B 5/02156 |
| | | | | | 600/488 |
| 5,311,452 A | | 5/1994 | Yokota et al. | | |
| 6,640,614 B1 | | 11/2003 | Bode et al. | | |

(Continued)

FOREIGN PATENT DOCUMENTS

| CN | 2511964 Y | 9/2002 |
| CN | 2930059 Y | 8/2007 |

(Continued)

*Primary Examiner* — Daniel S Larkin
*Assistant Examiner* — Jamar Ray
(74) *Attorney, Agent, or Firm* — Rabin & Berdo, P.C.

(57) ABSTRACT

A multi-range on-site full-automatic pressure calibration instrument includes a housing, a power switch, a plurality of interfaces, a display, a keyboard, a gas pressure generation unit, a power supply unit, a pressure detection unit and a gas pressure control unit. The gas pressure generation unit is a gas pressurizing pump communicated with atmosphere. A pressure output port of the pressure control unit is in parallel connection with pressure connectors used for installation of a plurality of pressure standard devices with different ranges and a calibrated gauge. The pressure control unit is in signal connection with the pressure standard device. The power supply unit can supply power by batteries. The calibration instrument does not need to be externally connected with a gas cylinder or an alternating current power supply and can automatically generate a gas pressure and generate an accurate standard pressure.

20 Claims, 5 Drawing Sheets

(51) Int. Cl.
*F04B 39/00* (2006.01)
*F04B 19/00* (2006.01)

(56) References Cited

U.S. PATENT DOCUMENTS

2004/0123643 A1* 7/2004 Kosh .................... G01L 27/005
 73/1.64
2011/0265899 A1* 11/2011 Cruse .................... G01L 27/005
 137/565.23

FOREIGN PATENT DOCUMENTS

| CN | 200941077 Y | 8/2007 |
| CN | 201034785 Y | 3/2008 |
| CN | 1 01169345 A | 4/2008 |
| CN | 101169345 A | 4/2008 |
| CN | 201107154 Y | 8/2008 |
| CN | 201155999 Y | 11/2008 |
| CN | 102305689 A | 1/2012 |
| CN | 202110034 U | 1/2012 |

* cited by examiner

MULTI-RANGE ON-SITE FULL-AUTOMATIC PRESSURE CALIBRATION INSTRUMENT

CROSS-REFERENCE TO RELATED APPLICATION

This is a continuation of U.S. application Ser. No. 14/122,087, filed on Nov. 25, 2013. These prior U.S. application and the present continuation application claim the benefit of priority of China Patent Application No. 201110139064.6, filed on May 26, 2011. The disclosures of these prior U.S. and foreign applications are incorporated herein by reference.

TECHNICAL FIELD

The present invention pertains to the area of measurement and calibration of pressure instrumentation, and mainly relates to automated calibration in that area. More particularly, it relates to an automated calibration equipment that is convenient to be carried to field, performs both calibration of pressure and output electric signals on pressure instruments, and can switch standard ranges.

BACKGROUND OF THE INVENTION

In the areas of industrial production, pressure measurement, etc., on-site verification or calibration needs to be carried out on all the utilized pressure gauges, after used for a certain period of time, in order to determine whether a pressure gauge is accurate.

In conventional pressure calibration instruments, operation is carried out in a closed pressure calibration pipe, where gas pressure is generated through manual pressurization, and pressure instrument indications are read out by observation, and where the gas pressure is regulated in a manual pressurizing manner. The effect of the regulation is to provide, at a pressure output port, a certain accurate gas pressure as a standard pressure for access of pressure instruments to be calibrated, so as to perform calibration on various pressure instruments.

However, such a conventional pressure calibration manner involves human observation and manually operated pressure regulation, suffers from large observation errors, and is time and effort consuming Especially in an industrial field or within a small pressure range, when performing pressure detection, manually adjusting pressure is not easily stabilized, observation is greatly affected by human disturbance factors, and working efficiency is quite low.

To solve this problem, increasing the working efficiency of pressure detection, in recent years, many companies have developed conventional pressure controllers. The pressure controller and an externally connected gas cylinder together form a device system. In a closed pressure calibration pipe, the gas cylinder provides a gas pressure according to a set pressure, and through automatic monitoring of a pressure sensor and automatic control of a pressure regulator, a set pressure output is provided for access of pressure instruments to be calibrated, so as to perform automatic calibration on the pressure instruments. This method overcomes the disadvantages of human observation and manually operated pressure regulation, can automatically monitor and adjust the pressure, and significantly improves the working efficiency.

Nonetheless, the conventional pressure controller is not portable due to its own large volume, the use of AC power supply for supplying power, large volume of the external gas cylinder, and place restriction on chemical gases within the cylinder, etc. For a large number of field used pressure instruments, there exists the disadvantage that calibration can not be implemented on-site.

As for a digital pressure instrument such as a pressure transducer, whether its output signal value is accurate or not directly affects the measured pressure thereof. Therefore, for such a digital pressure instrument, in addition to magnitude calibration for pressure of the instrument, magnitude calibration for electric signals (current, voltage, and switch pulse) thereof is also required. Among prior art full-automatic pressure calibration technologies, there is not yet a technology capable of integrating pressure calibration and electric signal calibration.

On the other hand, in prior art pressure controllers, typically one pressure sensor is used as a standard device and is incorporated in the instrument. In prior art pressure controllers, there are also cases of using two pressure sensors, where one is used as a pressure standard device, and the other is used to measure atmospheric pressure. In either case, the measuring range is a fixed single range, limiting pressure measurement and control range of the instrument. For some measuring ranges, unless another pressure controller with corresponding range is used, measurement accuracy will be affected by the measuring ranges. This requires a plurality of multi-range pressure controller devices at the time of pressure instrument calibration, causing inconvenience to on-site detection.

SUMMARY OF THE INVENTION

The object of the present invention is to provide an automated standard pressure and current signal calibration device that can overcome the above defects, is convenient to carry, and is suitable for use in the industrial field, namely, a multi-range on-site full-automatic pressure and electric signal calibration instrument.

To achieve the above object, the present invention provides the following technical solutions.

A multi-range on-site full-automatic pressure and electric signal calibration instrument, comprising: a housing; operation and control components including a power switch, a plurality of interfaces, a display, a keyboard, etc. incorporated at proper positions in the housing; and a gas pressure generation unit, a power supply unit, and a pressure detection unit incorporated in the housing, and further comprising a gas pressure control unit and an electric signal detection unit, wherein the gas pressure generation unit is a gas pressurizing pump communicated with atmosphere, a pressure output pipe thereof being communicated with the gas pressure control unit; a pressure output port of the pressure control unit is communicated in parallel with two pressure connectors, one for installation of a gauge to be calibrated in the pressure detection unit and the other for installation of a pressure standard device in the pressure detection unit, the pressure standard device being a manually replaceable standard gauge of a different range or a plurality of switchable pressure modules of different ranges; the pressure control unit is in signal connection with the pressure standard device in the pressure detection unit, the electric signal detection unit is in signal connection with the pressure control unit and the gauge to be calibrated in the pressure detection unit, and the power supply unit is in electrical connection with the gas pressure generation unit, the pressure control unit, the pressure detection unit and the electric signal detection unit, respectively.

The gas pressurizing pump comprises a motor, an eccentric shaft, a swing rod, a pump body, a left cylinder body and a right cylinder body, a piston rod, and an one-way valve body and a cylinder head attached to each of the cylinder bodies, wherein the pump body is a connecting member, the motor is fixed to the pump body, and a motor shaft extends into the pump body and is connected with the eccentric shaft; the eccentric shaft is of a cylindrical shape, and has a driving pin deviated from the axis at one end thereof, with the driving pin extending through a mounting hole in the flat-shaped swing rod; the swing rod is connected to the horizontally disposed piston rod through a screw; the piston rod is of a cylindrical shape, opposite ends thereof being mounted with sealing rings and extending into the left and right cylinder bodies, respectively; the cylinder body is of a cylindrical structure, and the two cylinder bodies are mounted at opposite ends of the pump body, respectively; the two cylinder bodies are sequentially provided at outer ends thereof with the one-way valve bodies and the cylinder heads, the one-way valve bodies being communicated with inner cavities of the cylinder bodies, and communicated with external air or compressed air lines through passages in the cylinder heads.

In the gas pressurizing pump, the piston rod forms sealing, through the sealing rings mounted at the opposite ends thereof, at an inner wall of the cylinder bodies; and a swing motion of the swing rod drives the piston rod to reciprocate within the two cylinder bodies along the axis.

In the gas pressurizing pump, the outer end of each of the cylinder bodies is mounted with two reversely disposed one-way valve bodies, wherein one of the one-way valve bodies is communicated with the external air, and the other of the one-way valve bodies is communicated with the compressed air line.

In the gas pressurizing pump, the one-way valve body is formed through assembly of a cavity seal body, an elastic arm, a metal pad, and a sealing ring, wherein the elastic arm extends inwardly from the cavity seal body and is coupled with a top end of the metal pad, and a bottom end of the metal pad fixes the sealing ring.

In the above multi-range on-site full-automatic pressure and electric signal calibration instrument, the power supply unit is a self-powered system by battery, or an external power source.

The pressure control unit comprises a pressure controller and a single-chip microcomputer system, wherein a gas path portion of the pressure controller includes an intake valve, a buffer, a micro-pressure adjusting mechanism, an exhaust valve, and a standard pressure output port; the standard pressure output port is provided with two pressure connectors connected in parallel; the intake valve is communicated with a high pressure gas output pipe of the gas pressurizing pump; the buffer is a pressure accommodating chamber used to stabilize and preserve gas pressure output by the intake valve, an outlet port of the buffer is communicated with a cylinder in the micro-pressure adjusting mechanism, and a plunger in the cylinder is connected with a screw mechanism; the exhaust valve is installed in a pressure output pipe and is communicated with the atmosphere to discharge gas pressure, and the standard pressure output port is installed in the pressure output pipe in parallel with the exhaust valve; a control portion of the pressure controller includes a pressure regulation driving circuit, which is in electrical connection with the power supply unit, and is in signal connection with the intake valve, the exhaust valve and the screw mechanism; the single-chip microcomputer system includes a control chip loaded with a pressure control algorithm, and is provided with a plurality of interfaces; the control chip is connected to the pressure regulation driving circuit, and controls the pressure output pipe through the driving circuit to output a precise standard pressure. The plurality of interfaces provided in the single-chip microcomputer system are a digital communication interface connected to the pressure standard device, a display interface, a keyboard interface, and a RS232 interface connected to an external device. The exhaust port of the exhaust valve is further installed with a muffler.

In the above multi-range on-site full-automatic pressure and electric signal calibration instrument, the electric signal detection unit comprises an electric signal detection circuit, an electric signal input and output terminal and a pressure switch signal input terminal of the gauge to be calibrated are connected to a signal amplifier respectively, then through an A/D converter, an electric signal is converted into a digital signal which is input to the control chip of the single-chip microcomputer system, and through calculation by a calculation formula preset in the control chip, a detected electric signal value or on/off status information of the pressure switch is obtained, and is then displayed by the display. The on/off signal information of the pressure switch is also used in the control chip for program determination on pressure output values measured at a corresponding state.

In the above multi-range on-site full-automatic pressure and electric signal calibration instrument, the pressure standard device is a standard gauge selected from a precision digital pressure gauge, a digital pressure calibrator, or an intelligent digital pressure calibrator provided with the above electric signal detection circuit, or the pressure standard device is a plurality of pressure modules with different ranges, each communicated through a respective solenoid valve with one of the pressure connectors at the standard pressure output port of the pressure controller, the solenoid valve being controlled by the control chip through a valve switching circuit; the single-chip microcomputer system further comprises a pressure module output signal switching element, through which an output signal of each pressure module is output to the control chip via the digital communication interface.

By taking the above design, the present invention has the following characteristics:

(i) requiring no external AC power supply, and convenient to carry to field;

(ii) requiring no external gas cylinder, reducing weight and volume, and convenient to carry on-site;

(iii) continuously on-site battery-powered, and capable of implementing on-site pressure calibration; and (iv) capable of automatic calibration on pressure and electric signals for pressure instruments of different types and various ranges.

The present invention requires no external gas cylinder or AC power source, and can automatically generates gas pressure. In a closed pressure calibration pipe, through automatic measurement and regulation on the auto-generated gas pressure, a certain accurate gas pressure is produced at the pressure output port, as a standard pressure provided to the pressure instrument to be. calibrated. The present invention is equipped with a plurality of standard gauges of different ranges, can perform exchange of a standard gauge of a corresponding range for different pressure detection ranges, and is thus readily adaptable to different user configurations. Pressure modules are used as the pressure standard device, can be incorporated in the controller and easy to carry, thus facilitates portability of the instrument, meanwhile pressure modules of different ranges are connected in parallel and switched for use, which can also facilitate calibration on calibrated gauges of different ranges. The present invention also combines an electric signal detection circuit, to perform detection and calibration on electric signals output by the calibrated gauge while performing pressure calibration on it, thereby implementing integrated calibration on pressure and electric signals. The present invention uses its own battery for power supply, requiring no external AC power source. The present invention also uses its own miniature pressure pump to generate gas pressure for supply to the pressure calibration loop, requiring no external gas cylinder. Taking the above design, the present invention not only achieves full-automatic calibration, but also increases the accuracy through the combined calibration on pressure and electric signals, while greatly reducing the weight and volume of the calibration instrument, facilitating on-site portability. The present invention achieves automated calibration on pressure instruments and significantly improves working efficiency while implementing on-site calibration on a large number of field used pressure instruments, thus can perform automated calibration on a variety of on-site pressure instruments.

DETAIL DESCRIPTION OF THE EMBODIMENTS

Figure 1:
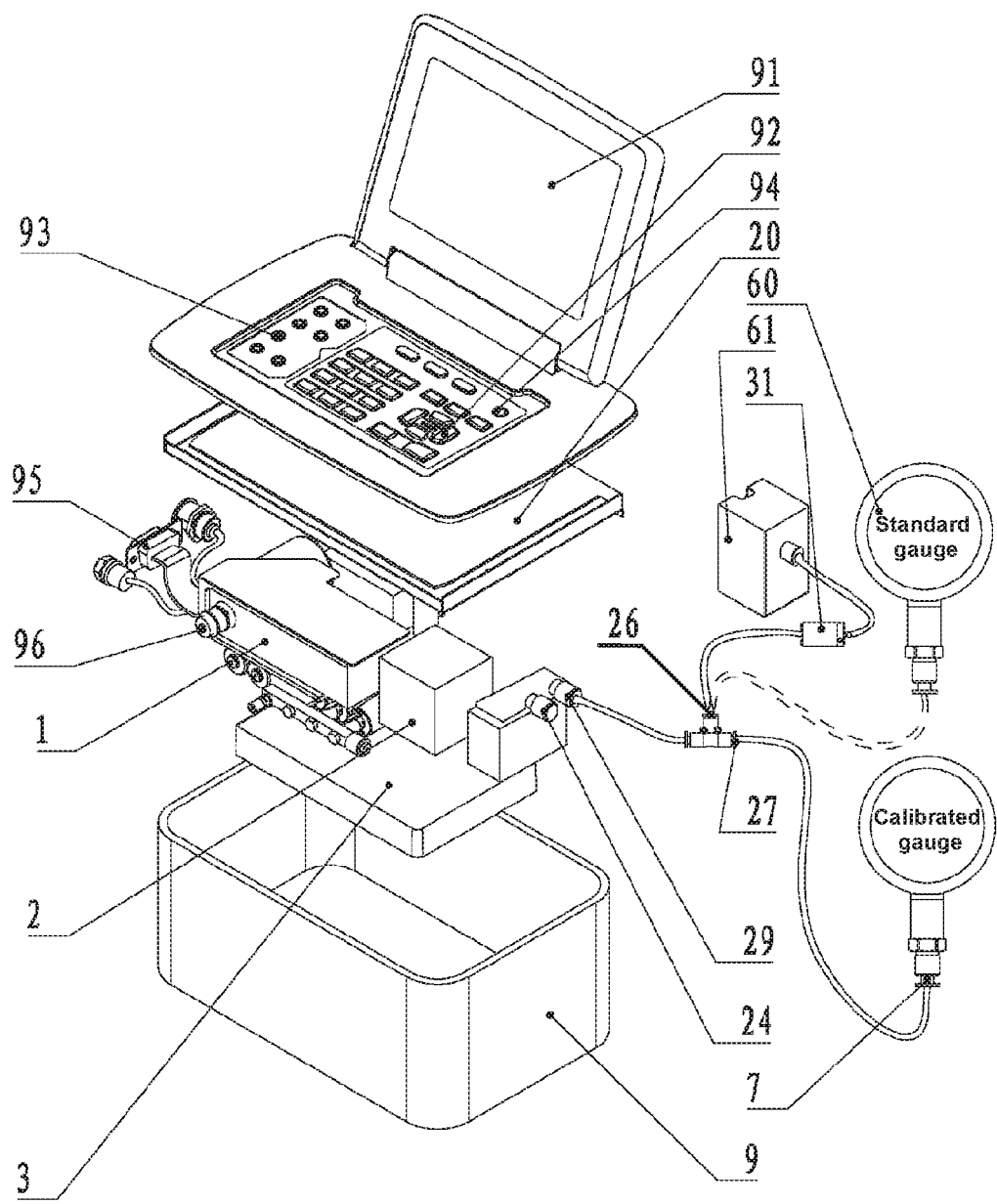
FIG. 1 is a configuration diagram of the on-site full-automatic pressure calibration instrument of the present invention.
Figure 2:
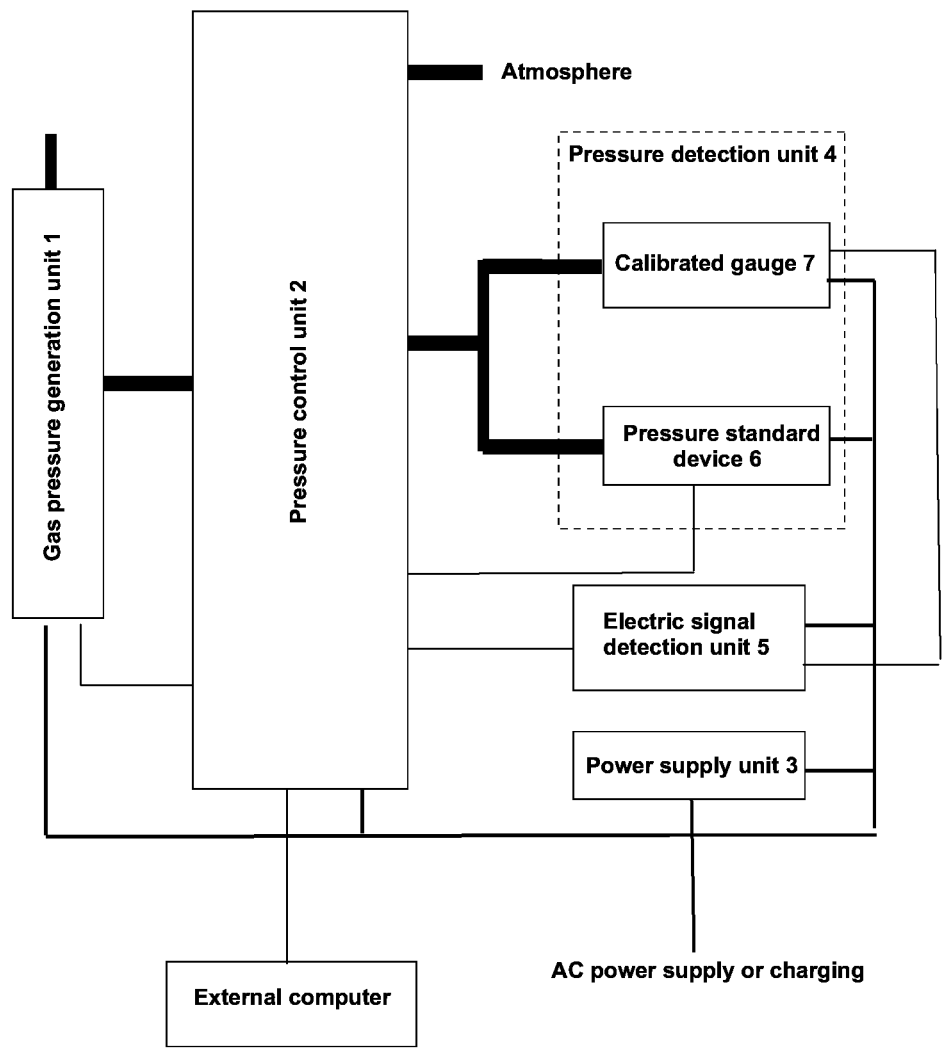
FIG. 2 is an overall block diagram of the internal configuration of the present invention.
Figure 3:
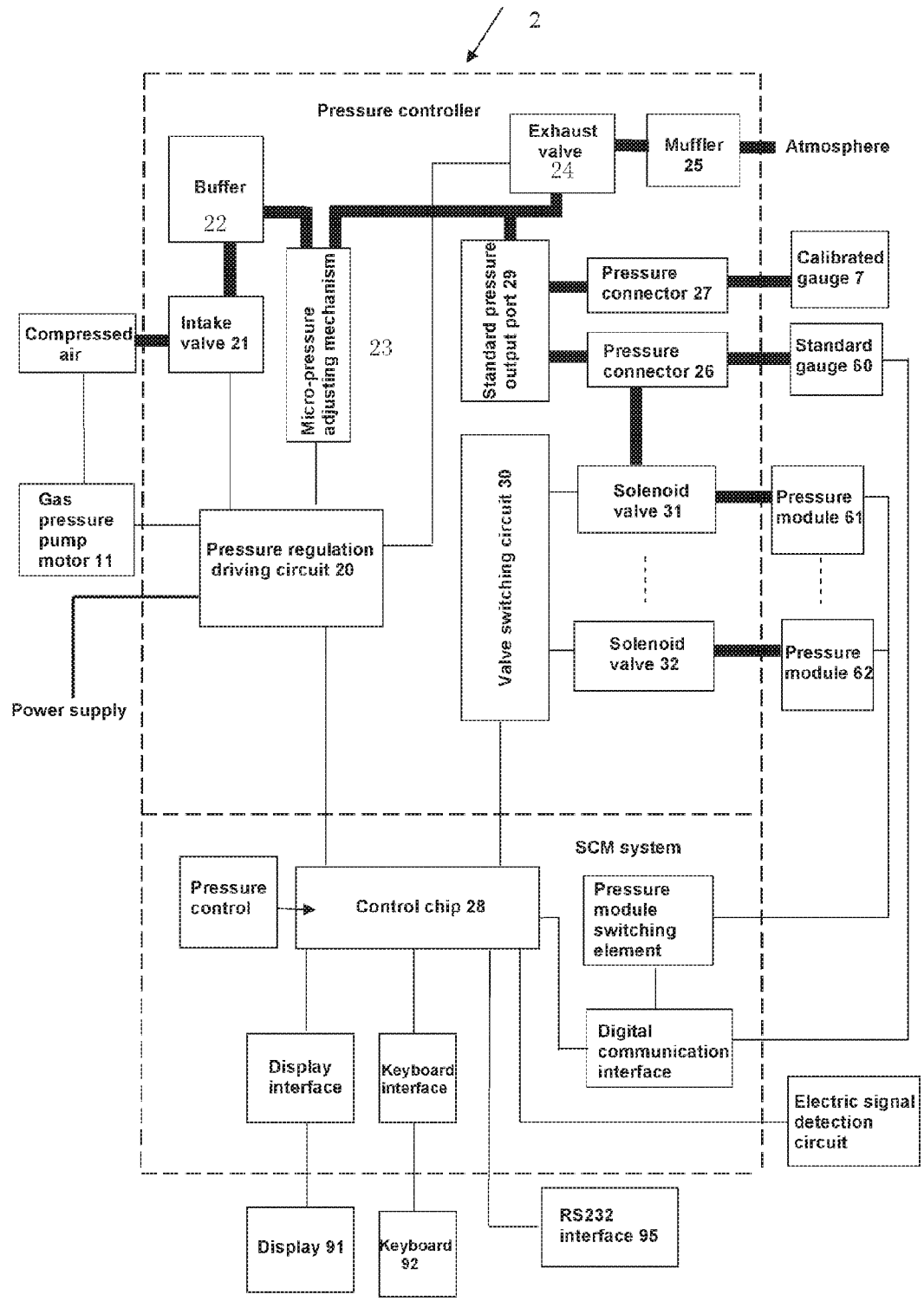
FIG. 3 is a block diagram showing the configuration of the pressure control unit of FIG. 2 and its connection with other units.

Referring to FIGS. 1, 2 and 3, the present invention provides an on-site full-automatic pressure calibration instrument, comprising: a housing 9; a gas pressure generation unit 1, a pressure control unit 2, an electric signal detection unit 5, a power supply unit 3, and a pressure detection unit 4 assembled respectively within the housing 9; a display 91, a keyboard 92, electric signal output ports 93 appropriately distributed for convenient use, a power switch 94 and a RS232 interface 95, etc. disposed on the top of the housing 9; a plurality of receiving grooves (not shown in the figures) provided in the internal space of the housing 9 for installation of standard gauges with different ranges for replacement, wherein the gas pressure generation unit 1 is provided with a gas path input port (inlet port) 96 communicating with the atmosphere, and an output port communicating with the pressure control unit 2; the pressure control unit 2 has a gas path output port 29 communicating with the pressure detection unit 4 (the thick lines in FIG. 2 indicating gas path connections), and is connected respectively with the gas pressure generation unit 1, the pressure detection unit 4, and the electric signal detection unit 5 through signal lines (the thin lines in FIG. 2 indicating data signal connections) for pressure control; and the power supply unit 3 is connected respectively with the gas pressure generation unit 1, the pressure control unit 2, the pressure detection unit 4, and the electric signal detection unit 5 through electric wires (the medium-thickness lines in FIG. 2 indicating power supply line connections) for power supply.

The gas pressure generation unit 1 generates gas pressure by a gas pressurizing pump. The gas pressurizing pump directly communicates with the atmosphere, and generates gas pressure through compressing air without an externally connected gas cylinder. Theoretically, any gas pump that can generate gas pressure through compressing air is applicable in the present invention. In the present invention, a gas pressurizing pump developed by the applicant is preferably used, which has functional properties of automatic pressurization, high pressure of pressurization, and high efficiency of pressurization, and uses a technique of high-pressure one-way valve.

Figure 4:
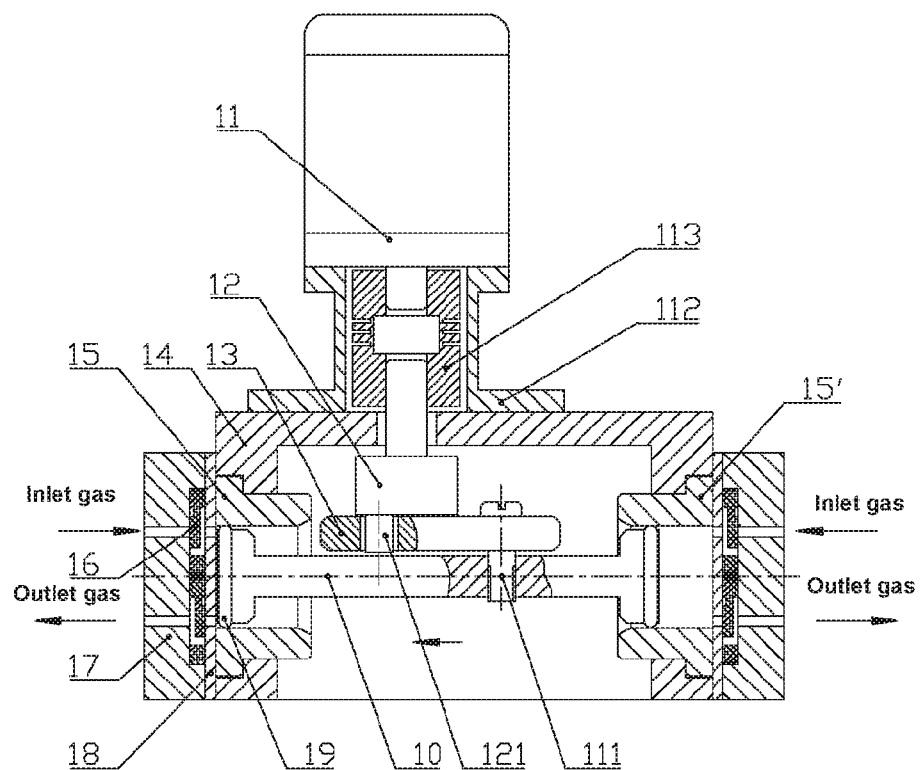
FIG. 4 is a structure diagram of the preferred miniature pressure pump of the present invention.

The gas pressurizing pump used in the present invention is a high pressure bidirectional miniature electric gas pump (miniature pressure pump), the structure of which is shown in FIG. 4, and which comprises a motor 11, an eccentric shaft 12, a swing rod 13, a pump body 14, a left cylinder body 15 and a right cylinder body 15', one-way valve bodies 16 and a piston rod 10. The pump body 14 is a connecting member. The motor 11 is fixed to the pump body 14 by a motor bracket 112, with a motor shaft extending downwardly into the pump body 14 via a coupling 113 and connected with the eccentric shaft 12. The eccentric shaft 12 is of a cylindrical shape and has a driving pin 121 deviated from the axis at one end thereof, with the driving pin 121 extending through a mounting hole in the flat-shaped swing rod 13. A screw 111 extends through another mounting hole in the swing rod 13 to couple the swing rod 13 to the horizontally directioned piston rod 10, with a gap between the swing rod 13 and the piston rod 10 being self-adjustable through a mounting distance given by the screws 111. The piston rod 10 is of a cylindrical structure, with sealing rings 19 mounted at opposite ends thereof. The opposite ends of the piston rod 10 extend into the left cylinder body 15 and the right cylinder body 15', respectively. The cylinder body is of a cylindrical structure, and the two cylinder bodies 15 and 15' are mounted at opposite ends of the pump body 14, respectively. The piston rod 10 forms sealing, through the sealing rings 19 mounted at the opposite ends thereof, at an inner wall of the cylinder bodies 15 and 15'. After symmetrical and bidirectional assembly of the cylinder bodies 15 and 15' at the opposite ends, upon swinging the swing rod 13 drives the piston rod 10 to reciprocate along the axis, and at the same time the sealing rings 19 at the opposite ends become guide rings for the piston rod 10, thereby structurally realizing a manner of self-aligning guidance, and achieving driving and sealing of the gas pump. The two cylinder bodies 15 and 15' are sequentially provided at outer ends thereof with cylinder head gaskets 18, the one-way valve bodies 16, and cylinder heads 17 fixedly mounted at the opposite ends of the pump body 14, where two one-way valve bodies 16 are mounted in mutually reverse directions, respectively at each of the opposite ends of the pump body 14. The one-way valve bodies 16 communicates with inner cavities of the cylinder bodies 15 and 15', and communicates with external air or compressed air lines through passages in the cylinder heads 17. The one-way valve bodies 16 are mounted in the same gas inlet and outlet directions as those shown in FIGS. 4 and 5.

Figure 5:
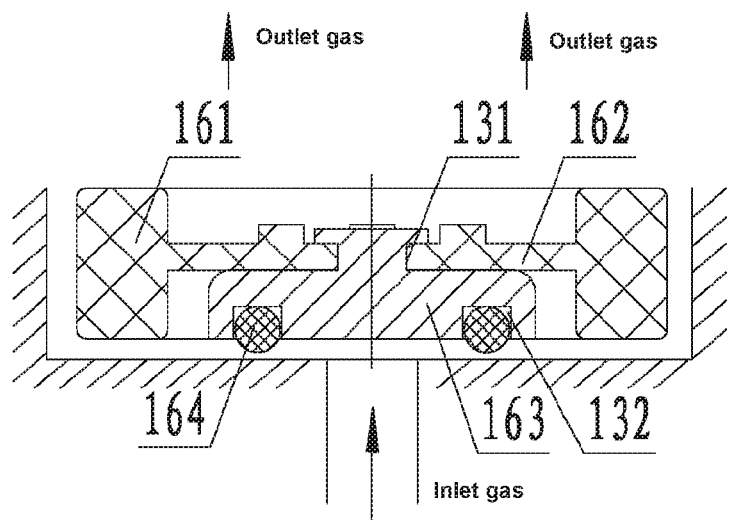
FIG. 5 is a structure diagram of the preferred one-way valve used in the miniature pressure pump of the present invention.

Here, refer to FIG. 5 for structure of the one-way valve body 16, which comprises a cavity seal body 161, an elastic arm 162, a metal pad 163, and a sealing ring 164, wherein the cavity seal body 161 is of an annular structure, is an outer support and seal for the whole structure, is disposed between two planes to be sealed (between the cylinder head and the cylinder body), forms a sealed cavity, also used as a seal for the overall structure, and is made of elastic material; the elastic arm 162 is of a strip-like structure extending inwardly from the cavity seal body 161, and can be stretched and retracted by its rubber elasticity, with a bottom of the elastic arm 162 abutting against a top of the metal pad 163; the metal pad 163 is disc-shaped, having an upper annular slot 131 for embedding an extended end of the elastic arm 162 such that it is engaged into the slot 131 and that a bottom surface of the elastic arm 162 abuts against the top of the metal pad 163, and the metal pad 163 is provided at a bottom thereof with an annular groove 132 for placing the sealing ring 164 therein; the sealing ring 164 is a standard O-ring, and is fixed within the groove 132 in the bottom of the metal pad 163. During installation, the one-way valve body 16 is of gas inlet and outlet directions consistent with those of the miniature pressure pump 1 (shown in FIG. 4), forming one-way inlet gas. When high pressure gas is discharged (exhausting), the piston 10 in the cylinder body 15 moves leftward to compress gas within the cylinder, and an one-way valve 16 mounted at a lower side is operated, pushing a side of the metal pad 163 embedded with the O-ring 164 to move (in the gas outlet direction) along with the sealing ring. As a result, the one-way valve body 16 is in an open state, and the compressed high pressure gas is pushed into a high pressure gas output pipe through a gas passage. When the piston rod 10 in the cylinder body 15 is in a return stroke, the elastic arm 162 causes the metal pad 163 to move backward (in an opposite direction to the gas inlet direction), compressing the sealing ring 164 so as to form a surface sealing, such that the high pressure gas is enclosed in the desired cavity, and a requirement of high pressure closure is fulfilled. When the external air is intaken (suctioning), the piston 10 in the cylinder body 15 moves rightward to form a negative pressure with gas in the cylinder, and an one-way valve 16 mounted at an upper side is operated, pushing a side of the metal pad 163 embedded with the O-ring 164 to move (in the gas outlet direction of FIG. 5) along with the sealing ring. As a result, the one-way valve body 16 is in an open state, and the external air is intaken into the cylinder body 15 through a gas passage. Throughout the entire process, the cavity seal body 161 isolates the high pressure gas from the external environment, while supporting through the elastic arm 162 connected thereto the metal pad 163 and the sealing ring 164, thereby forming an integrated sealing. Since at each end of the pump body 14 are mounted two one-way valve bodies 16 in mutually opposite orientations with one for intake control and the other for exhaust control, an one-direction gas movement is formed during the reciprocating motion of the piston 10, and compressed gas is generated when gas is placed in the closed spaces.

When the miniature pressure pump of such a structure is operating, the motor 11 drives the eccentric shaft 12 to rotate, and the driving pin on the eccentric shaft 12 pulls the piston rod 10 through the swing rod 13 and the screw 111, so that the piston rod 10 can reciprocate. The piston rod 10 forms sealing with the cylinder body 15 through the sealing rings 19 mounted at the opposite ends thereof. A process of generating high pressure gas will now be described, taking the left part of the cylinder as an example. When the piston rod 10 moves rightward, the inner space of the left cylinder body 15 increases rapidly, forming a negative pressure inside the cylinder body 15, so that the upper left one-way valve body 16 is placed in an intake state (the reversely disposed one-way valve core is opened), and the external air is intaken into the cylinder body 15. Till the swing rod 13 moves to a right limit position, the reversely disposed one-way valve body 16 is closed, and the intake process is completed. When the piston rod 10 moves leftward, the sealed gas inside the left cylinder body 15 is compressed with the pressure gradually increased, so that the lower left one-way valve body 16 is placed in an exhaust state (the forwardly disposed one-way valve core is opened), and the compressed air is discharged. Till the swing rod 13 moves to a left limit position, the forwardly disposed one-way valve body 16 is closed, and the exhaust process (of delivering high-pressure compressed gas) is completed. The motor drives the eccentric shaft 12, and then causes the piston rod 10 to reciprocate through the swing rod 13. Thus, the intake process and the exhaust process are repeated continuously, and gas is compressed continuously generating high pressure gas. The symmetrical and bidirectional placement of the cylinders 15 and 15' can perform twice during one cycle the operations of intaking air from outside and discharging compressed gas from within the cylinders, which also improves efficiency.

The gas pressure generation unit 1 is a high pressure generation end in the present invention, It uses the miniature pressure pump to intake air from outside, compress the air and exhaust the compressed gas through the pipe to generate high pressure. It then cooperates with a pressure controller and a pressure standard device to implement real-time measurement and transmission of pressure. Through automatic measurement and regulation of the pressure, a certain accurate gas pressure is generated or produced at a pressure output port, as a standard pressure provided for pressure instruments to be calibrated.

The pressure control unit 2 achieves control of gas pressure through a pressure controller and a single-chip microcomputer (SCM) system. As shown in FIG. 3, a gas path portion of the pressure controller includes an intake valve 21, a buffer 22, a micro-pressure adjusting mechanism 23, an exhaust valve 24 (refer to FIG. 1 for layout position), a muffler 25, and a standard pressure output port 29. The standard pressure output port 29 is connected in parallel with a pressure connector 27 of a calibrated gauge and a pressure connector 26 of a pressure standard device. When the pressure standard device is a standard gauge, the standard gauge 60 is directly connected to the pressure connector 26, and by manual replacement of a standard gauge 60 of a different range, calibration is performed on a gauge to be calibrated of a corresponding range. However, when the pressure standard device is a pressure module (pressure sensor), the pressure connector 26 is communicated with pressure modules 61 or 62 respectively by a plurality of solenoid valves 31 or 32, and is switched to the pressure module 61 or 62 of a different range through a valve switching circuit 30. The above components are communicated respectively via gas paths (the thick lines in FIG. 3 indicating gas paths). A control portion of the pressure controller 2 includes a pressure regulation driving circuit 20 and the valve switching circuit 30. The SCM system comprises a control chip 28 loaded with a pressure control algorithm and an electric signal (voltage, current) algorithm, and is provided with a plurality of interfaces, such as a digital communication interface (connected to the standard gauge 60 or connected to the pressure modules 61 and 62 via a sensor switching element), a display interface (connected to the display 91), a keyboard interface (connected to the keyboard 92), and a RS232 interface 95 to facilitate connections with external devices when necessary, and the like. The pressure regulation driving circuit 20 is connected to the power supply unit via a power supply line (indicated by the medium-thickness lines in FIG. 3), and is connected respectively to the intake valve 21, the micro-pressure adjusting mechanism 23, the exhaust valve 24, and the control chip 28 via signal lines (the thin lines in FIG. 3 indicating signal lines for pressure control). When the miniature pressure pump shown in FIG. 4 is used as the gas pressure generation unit 1, the pressure regulation driving circuit 20 is further connected to the motor 11 of the miniature pressure pump via a signal line to control operations thereof. The valve switching circuit 30 is connected to the plurality of solenoid valves 31 and 32 and the control chip 28 via signal lines (indicated by the thin lines in FIG. 3) to control operations of the pressure modules through opening and closing of the solenoid valves.

The intake valve 21 is communicated with the high pressure gas output pipe of the miniature pressure pump 1 and functions as a pressure input port to the pressure controller. A pressure output port 29 of the pressure controller is the two pressure connectors 26, 27 connected in parallel. The buffer 22 is a pressure accommodating chamber of a fixed shape (e.g., an elliptical cylinder shape), mainly used to filter fluctuations in air flow entering through the intake valve 21, stabilize and preserve gas pressure. The gas passing through the buffer 22 enters the micro-pressure adjusting mechanism 23. The micro-pressure adjusting mechanism 23 comprises a cylinder and a plunger installed in the cylinder. The plunger is connected with a screw mechanism (reference can be made to the Chinese Patent No. ZL200720190548.2, "Automatic micro-pressure generator"), and the screw mechanism is connected to and a feed thereof controlled by the pressure regulation driving circuit 20. Driven by the screw mechanism, the plunger performs linear displacement in the cylinder, so as to change the volume of gas compression within the cylinder and to deliver the compressed gas. The output gas pressure passes through the micro-pressure adjusting mechanism 23 to achieve accurate control and regulation on pressure. The exhaust valve 24 is installed in the output pipe to discharge gas pressure. It is controlled by the pressure regulation driving circuit 20 to open and close in order to adjust the discharge of the gas pressure. It may further be connected to a muffler 25 for purpose of eliminating airflow friction sound generated when discharging the gas pressure. The pressure connectors 26, 27 and the exhaust valve 24 are connected in parallel via gas paths to ensure the same output pressure. The control functions of the pressure regulation driving circuit 20 are performed under the drive of the control chip 28 of the SCM system, mainly to implement electric control on the open/close state of the intake valve 21 and the exhaust valve 24, so as to achieve regulation on gas inflow or discharge pressure, and to implement control on the displacement of the plunger within the micro-pressure adjusting mechanism 23 by controlling the feed of the screw mechanism, so as to achieve regulation on the output pressure by changing the volume of gas compression in the cylinder.

The SCM system includes the embedded control chip 28, and the display interface, the keyboard interface and the digital communication interface, and may also be provided with a RS232 interface 95. The control chip 28 is embedded therein with a pressure control algorithm (such as the well-known special adaptive PID control algorithm) and an electric signal (voltage, current) algorithm. The digital communication interface of the SCM system, when the pressure standard device is a standard gauge, can directly receive a pressure value displayed and returned by the standard gauge 60. However, when the pressure standard device is a plurality of pressure modules (of different ranges), through a module switching element (e.g., a locator), a pressure value of the located pressure module 61 or 62 is returned to the control chip 28 through the digital communication interface. Through comparison with a preset pressure value in the chip, the pressure control algorithm calculates a control amount based on the difference value, and then transmits the calculated control amount to the pressure regulation driving circuit 20. The pressure regulation driving circuit 20 thus achieves control on the intake valve 21, the exhaust valve 24 and the micro-pressure adjusting mechanism 23, thereby implementing a feedback control in which pressure occurs precisely. The control chip 28 as well as the pressure regulation driving circuit 20, the valve switching circuit 30 and the pressure standard device 6 constitute a pressure output control unit for real-time control of pressure output. The control chip 28 as well as the pressure regulation driving circuit 20, the calibrated instrument 7, and the external display 91 and keyboard 92 of the SCM system constitute a pressure measurement and control unit, wherein set pressures and programmable operation data and parameters are input through the keyboard 92, and pressure control results and curves are displayed through the standard gauge 60 or the display 91. The control chip 28 is further connected to the electric signal detection unit 5, to implement detection and calibration on output signals of the calibrated gauge (refer to FIG. 3, the thin lines indicating signal connections). The RS232 interface 95 is reserved for use in conditional detection environments, and can be connected with other external devices, such as an external computer (refer to FIG. 2), a printer, etc.

The operation of the pressure control unit 2 is as follows. A pressure value is set according to the range of a pressure gauge 7 to be calibrated, and is used as a set pressure control value. The pressure control value is input to the control chip 28 via the keyboard 92. The pressure regulation driving circuit 20 drives the motor 11 of the miniature pressure pump to operate thereby generating high pressure gas. A value is read out through the standard gauge 60 connected to the pressure connector 26 (or recorded by a pressure sensor 61 or 62, a range of which matches that of the pressure gauge 7 to be calibrated, and which is selected through the valve switching circuit 30), and the output pressure value is returned to the control chip 28. The control chip 28 compares the output pressure with the pressure control value, calculate a control amount based on the difference value, and transmits the calculated control amount to the pressure regulation driving circuit 20. The pressure regulation driving circuit 20 performs control on the intake valve 21, the exhaust valve 24 and the micro-pressure adjusting mechanism 23. Until the output pressure value is equal to the set pressure control value, the precise control of the output pressure is completed.

Thus, in a closed pressure calibration pipe, through fine adjustment of the plurality of pressure control regulators (the intake valve, the exhaust valve) and the micro-pressure adjusting mechanism, the pressure control unit performs setting control on the gas pressure, and outputs an accurate gas pressure at the pressure output port. Based on the accurately output gas pressure value, an accurate pressure calibration is carried out on the pressure gauge to be calibrated.

The power supply unit 3 is primarily a battery pack equipped in the instrument. It can maintain power supply without an external power source at the same time, making it possible to be carried to field. In case power is available in the field, the power supply unit may also be connected to an external power source (refer to FIG. 2), and supply power by the external power source. In addition, the external power source can also charge the battery pack.

Figure 6:
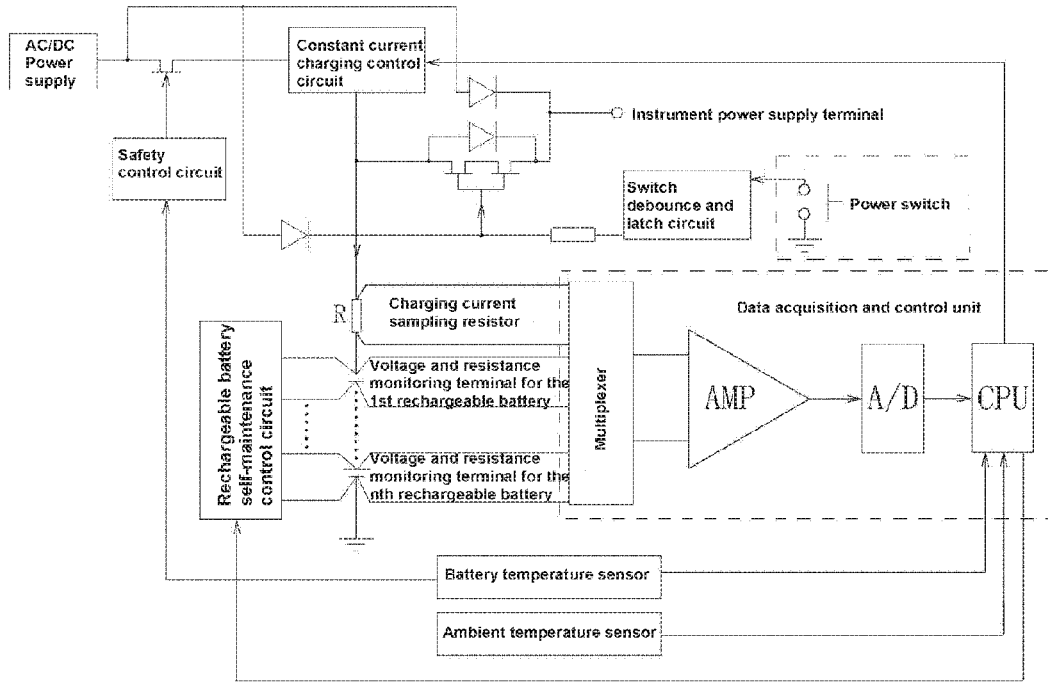
FIG. 6 shows the power supply/charge control circuit used in the present invention.

The battery pack power supply unit used in the present invention may be a conventional DC power supply system, preferably a power supply system with functions of battery power supply monitoring, control and protection, as well as battery pack power supply and charge control. Used herein is the power supply/charge control circuit disclosed in the Chinese Patent No. ZL200620119089.4, "Power supply/charging control circuit," as shown in FIG. 6, in which circuit the AC/DC power supply terminal is connected to an external power source, and the instrument power supply terminal is the current output terminal. Power is transmitted respectively to other units in the pressure calibrator, as shown in FIG. 2. The power supply unit can ensure good DC power supply performance, no power supply interruption, good battery charging performance, safe use of battery, and extended life span. When used in the pressure calibrator, it enables the pressure calibrator to be accurate in detection, safe and reliable, of long operating time, and convenient to be carried for field application.

The pressure detection unit 4 includes pressure standard devices of at least two ranges so as to be able to perform calibration on calibrated gauges of different ranges. The pressure standard device 6 is attached to one pressure connector 26 at the pressure output port 29 of the pressure controller, and the calibrated gauge 7 is attached to the other pressure connector 27 at the pressure output port 29 of the pressure controller. The pressure standard device 6 can be a precision digital pressure gauge, a digital pressure calibrator, an (absolute pressure) digital pressure gauge, or an intelligent digital pressure calibrator, collectively called standard gauge 60, but it may also be a pressure module (pressure sensors 61 and 62). In case of the standard gauge, a plurality of standard gauges with different ranges need to be equipped, and replaced manually at the pressure connector 26. In case of the pressure module, a plurality of pressure modules 61 and 62 may be fixedly arranged and communicated with the pressure connector 26 via the respectively connected solenoid valves 31 or 32. The pressure standard device 6 (standard gauge or pressure module) is attached to the pressure connector 26, and for different pressure ranges, the pressure standard device is replaced with one of corresponding range (as shown in FIG. 1, a pressure module may be used and communication indicated by the solid line, or alternatively a standard gauge may be used and communication indicated by the broken line), so that the range of pressure measurement and control is not limited, and the measurement accuracy is not affected by the measurement range. The pressure standard device 6 is in signal connection with the pressure controller (refer to FIG. 3), performs real-time measurement (observation) of gas path pressure in a closed pressure calibration loop, provides real-time transmission of its continuous pressure measurement data to the control chip 28 for real-time control on the output pressure, and takes measurement result of ultimate control at a certain pressure set point as the standard value for pressure calibration, for assignment to the output standard pressure and for display on the display.

The electric signal detection unit 5. When using the standard gauge 60 as the pressure standard device 6, a digital pressure calibrator (a previous invention patent of the company, Chinese Patent No. ZL200610114103.6) can be used as the standard gauge. The digital pressure calibrator is provided with an electric signal detection function, which is combined with the control chip 28 of the pressure control unit 2 to perform detection and calibration on electric signals output by the calibrated gauge while performing pressure calibration on it, thereby implementing integrated calibration on pressure and electric signals, and achieving full-automatic pressure calibration.

When using the pressure module (61, 62) as the pressure standard device, a reference can be made to Chinese Patent No. ZL200610114103.6 for the electric signal detection circuit of the digital pressure calibrator. A standard electric signal detection circuit is provided to measure electric signals output by the pressure gauge, and is integrated with the pressure sensors and the pressure controller to perform detection and calibration on electric signals output by the calibrated gauge while performing pressure calibration on it, thereby implementing integrated calibration on pressure and electric signals, and achieving portable full-automatic pressure calibration.

Figure 7:
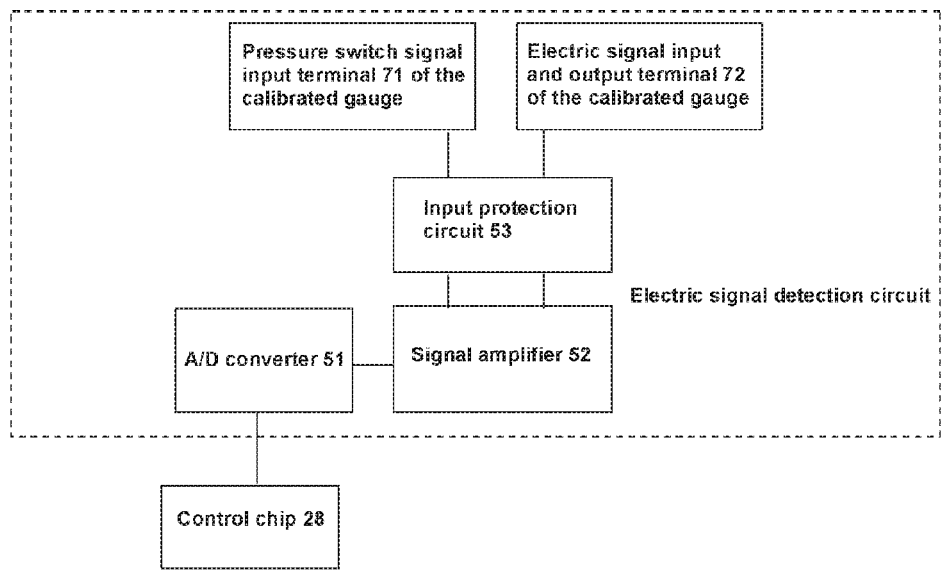
FIG. 7 shows the electric signal detection circuit used in the present invention.

The electric signal detection circuit is shown in FIG. 7. When the standard pressure of the pressure control unit is applied to the calibrated gauge, electric signals will be generated at a pressure switch signal input terminal 71 and an electric signal input and output terminal 72 thereof. The pressure switch signal input terminal 71 and the electric signal input terminal 72 are connected to a signal amplifier 52, respectively, to input the generated electric signals to the signal amplifier 52. Through signal amplification processing of the signal amplifier 52, an electric signal is input to an A/D converter 51 connected thereto, and is then converted into a digital signal through the A/D converter 51, the digital signal in turn is input to the control chip 28 connected thereto. In the control chip 28, through calculation by a calculation formula preset in the control chip 28, a detected electric signal value or on/off status information of the pressure switch is obtained, and is then displayed by the display 91. At this time, the detected electric signal value may used not only as a display value of the electric signal output by the pressure instrument, but also as a calibration value for the electric signal output by the pressure instrument, and is used to determine the accuracy of the electric signal value output by the pressure instrument with respect to the standard value, or used to determine the consistency of the electric signal value output by the pressure instrument with a prescribed value. Electric signal calibration data will also be stored in a memory of the controller chip 28.

The on/off signal information of the pressure switch is also used in the control chip for program determination on pressure output values measured at a corresponding state.

In actual use of the instrument, due to careless operations of personnel, signal lines may be misconnected, and in this instance, an input electric signal will damage the signal amplifier. To this end, an input protection circuit 53 is specifically added. Each input electric signal is protected by the input protection circuit 53, and then enters the signal amplifier 52 and the A/D converter 51, so as to avoid damage to the circuit. The principle of the input protection circuit 53 is that, when a problem occurs in the input signal, an impedance of the input protection circuit 53 will change to form a protective circuit, so as to prevent a too strong electric signal from damaging the signal amplifier 52 and the A/D converter 51, and when the input signal is removed, the input protection circuit 53 will restore the original impedance state. The input protection circuit 53 can be commercially available.

The standard electric signal detection circuit of the electric signal detection unit 5 implements measurement, calibration or detection of high accuracy on the electric signals (current, voltage, switch pulse, etc.) output by the calibrated pressure instrument. The electric signal calibration and detection results and curves are displayed by the display.

The above respective units are interconnected and assembled in the housing, the placement of which is not particular limited (shown in FIG. 1 is only a specific form of assembly), subject to the convenience of use. For example, the display, the keyboard and the power switch, the signal output ports, and the RS232 interface, etc. can be directly provided on the surface of the housing, and the inlet port 96 of the high pressure gas generating unit 1, the exhaust port 24 of the pressure controller 2, the pressure connector 26 along with the pressure standard device 6, and the pressure connector 27 along with the calibrated gauge 7 can be extended, respectively, out of the housing 9. Of course, the housing may further be provided with accessories such as covers, handles, straps, etc. for convenience of carry, thereby forming a compact, portable on-site full-automatic pressure calibration instrument.

INDUSTRIAL APPLICABILITY

The on-site full-automatic pressure calibration instrument of the present invention does not require external gas cylinders. The gas pressure generation unit generates compressed air and input the same into a closed pressure calibration pipe of the pressure controller. The gas pressure control unit performs automatic measurement and regulation on the auto-generated gas pressure. At the pressure output port, a certain accurate gas pressure is output as a standard pressure provided to the pressure instrument to. be. calibrated. As a result, measurement and calibration of high accuracy is implemented. The instrument uses its own battery for power supply, requiring no external AC power source. The full-automatic pressure calibration instrument achieves automated calibration of pressure instruments and significantly improves working efficiency while greatly reducing its own weight and volume. The instrument can be conveniently carried to field, and can implement on-site calibration on a large number of field used pressure instruments.

The invention claimed is:

1. A multi-range on-site full-automatic pressure calibration instrument, comprising:
   a housing;
   operation and control components including a power switch, a plurality of interfaces, a display and a keyboard incorporated at positions in the housing;
   a gas pressure generation unit incorporated in the housing;
   a power supply unit incorporated in the housing;
   a pressure detection unit incorporated in the housing; and
   a gas pressure control unit incorporated in the housing, wherein
   the gas pressure generation unit is a gas pressurizing pump communicated with atmosphere, a pressure output pipe thereof being communicated with the gas pressure control unit;
   a pressure output port of the pressure control unit is communicated in series with two parallel pressure connectors of the pressure control unit, one of the pressure connectors for installation of a gauge to be calibrated in the pressure detection unit and the other of the pressure connectors for installation of a pressure standard device in the pressure detection unit, the pressure standard device being a manually replaceable standard gauge from among a plurality of equipped standard gauges having different measurement ranges or being a plurality of switchable pressure modules having different measurement ranges;
   the pressure control unit is in signal connection with the pressure standard device in the pressure detection unit, and the power supply unit is in electrical connection with the gas pressure generation unit, the pressure control unit, and the pressure standard device in the pressure detection unit, respectively.

2. The multi-range on-site full-automatic pressure calibration instrument of claim 1, wherein the pressure control unit comprises a pressure controller and a single-chip microcomputer system, wherein
   a gas path portion of the pressure controller includes an intake valve, a buffer, a micro-pressure adjusting mechanism, an exhaust valve, and a standard pressure output port;
   the standard pressure output port is provided with the two of the pressure connectors connected in parallel;
   the intake valve is communicated with a high pressure gas output pipe of the gas pressurizing pump;
   the buffer is a pressure accommodating chamber used to stabilize and preserve pressurized gas output by the intake valve, an outlet port of the buffer is communicated with a cylinder in the micro-pressure adjusting mechanism, and a plunger in the cylinder is connected with a screw mechanism;
   the exhaust valve is installed in a pressure output pipe of the pressure controller and is communicated with the atmosphere to discharge gas pressure;
   the standard pressure output port is installed in the pressure output pipe of the pressure controller in parallel with the exhaust valve;
   a control portion of the pressure controller includes a pressure regulation driving circuit, which is in electrical connection with the power supply unit, and is in signal connection with the intake valve, the exhaust valve and the screw mechanism; and
   the single-chip microcomputer system includes a control chip loaded with a pressure control algorithm, and is configured to form the plurality of interfaces;
   the control chip is connected to the pressure regulation driving circuit, and controls the pressure output pipe of the pressure controller through the driving circuit to output a precise standard pressure.

3. The multi-range on-site full-automatic pressure calibration instrument of claim 2, wherein the pressure standard device is the plurality of switchable pressure modules having different measurement ranges, each communicated through a respective solenoid valve with one of the pressure connectors at the standard pressure output port of the pressure controller, the solenoid valve being controlled by the control chip through a valve switching circuit;
   the single-chip microcomputer system further comprises a pressure module switching element, through which each of the pressure modules outputs data to the control chip via a digital communication interface.

4. The multi-range on-site full-automatic pressure calibration instrument of claim 3, wherein the plurality of interfaces provided in the single-chip microcomputer system are the digital communication interface connected to the pressure standard device, a display interface, a keyboard interface, and a RS232 interface connected to an external device.

5. The multi-range on-site full-automatic pressure calibration instrument of claim 2, wherein the plurality of interfaces provided in the single-chip microcomputer system are a digital communication interface connected to the pressure standard device, a display interface, a keyboard interface, and a RS232 interface connected to an external device.

6. The multi-range on-site full-automatic pressure calibration instrument of claim 2, wherein the gas pressurizing pump comprises a motor, an eccentric shaft, a swing rod, a pump body, a left cylinder body and a right cylinder body, a piston rod, and a plurality of one-way valve bodies and cylinder heads attached to each of the left and right cylinder bodies, wherein
   the pump body is a connecting member, the motor is fixed to the pump body, and a motor shaft of the motor extends into the pump body and is connected with the eccentric shaft;
   the eccentric shaft is of a cylindrical shape, and has at one end thereof a driving pin deviated from the axis of the eccentric shaft, with the driving pin extending through a mounting hole in the swing rod which is flat-shaped;

the swing rod is connected to the piston rod, which is horizontally disposed, through a screw;

the piston rod is of a cylindrical shape, opposite ends thereof being mounted with sealing rings, the opposite ends extending into the left and right cylinder bodies, respectively;

the left and right cylinder bodies are each of a cylindrical structure, and the left and right cylinder bodies are mounted at opposite ends of the pump body, respectively; and each of the left and right cylinder bodies is sequentially provided at an outer end thereof with the one-way valve bodies and the cylinder heads, the one-way valve bodies being communicated with an inner cavity of the left and right cylinder bodies, and communicated with external air or compressed air lines through passages in the cylinder heads.

7. The multi-range on-site full-automatic pressure calibration instrument of claim 6, wherein the piston rod forms sealing, through the sealing rings mounted at the opposite ends thereof, at an inner wall of the left and right cylinder bodies; and a swing motion of the swing rod drives the piston rod to reciprocate within the left and right cylinder bodies along the axis.

8. The multi-range on-site full-automatic pressure calibration instrument of claim 7, wherein the outer end of each of the left and right cylinder bodies is mounted with two reversely disposed ones of the one-way valve bodies, which are a part of the plurality of one-way valve bodies, such that one of the reversely disposed one-way valve bodies is communicated with the external air, and the other of the reversely disposed one-way valve bodies is communicated with the compressed air line.

9. The multi-range on-site full-automatic pressure calibration instrument of claim 8, wherein the plurality of one-way valve bodies are formed through assembly of a cavity seal body, an elastic arm, a metal pad, and a sealing ring, wherein the elastic arm extends inwardly from the cavity seal body and is coupled with a top end of the metal pad, and a bottom end of the metal pad is fixed with the sealing ring of the plurality of one-way valve bodies.

10. The multi-range on-site full-automatic pressure calibration instrument of claim 6, wherein the pressure standard device is the plurality of switchable pressure modules having different measurement ranges, each communicated through a respective solenoid valve with one of the pressure connectors at the standard pressure output port of the pressure controller, the solenoid valve being controlled by the control chip through a valve switching circuit;

the single-chip microcomputer system further comprises a pressure module switching element, through which each of the pressure modules outputs data to the control chip via a digital communication interface.

11. The multi-range on-site full-automatic pressure calibration instrument of claim 10, wherein the plurality of interfaces provided in the single-chip microcomputer system are the digital communication interface connected to the pressure standard device, a display interface, a keyboard interface, and a RS232 interface connected to an external device.

12. The multi-range on-site full-automatic pressure calibration instrument of claim 6, wherein the plurality of interfaces provided in the single-chip microcomputer system are a digital communication interface connected to the pressure standard device, a display interface, a keyboard interface, and a RS232 interface connected to an external device.

13. The multi-range on-site full-automatic pressure calibration instrument of claim 6, wherein the pressure standard device is a standard gauge, the standard gauge being a precision digital pressure gauge or a digital pressure calibrator.

14. The multi-range on-site full-automatic pressure calibration instrument of claim 2, wherein the pressure standard device is a standard gauge, the standard gauge being a precision digital pressure gauge or a digital pressure calibrator.

15. The multi-range on-site full-automatic pressure calibration instrument of claim 1, wherein the gas pressurizing pump comprises a motor, an eccentric shaft, a swing rod, a pump body, a left cylinder body and a right cylinder body, a piston rod, and a plurality of one-way valve bodies and cylinder heads attached to each of the left and right cylinder bodies, wherein the pump body is a connecting member, the motor is fixed to the pump body, and a motor shaft of the motor extends into the pump body and is connected with the eccentric shaft;

the eccentric shaft is of a cylindrical shape, and has at one end thereof a driving pin deviated from the axis of the eccentric shaft, with the driving pin extending through a mounting hole in the flat shaped swing rod which is flat-shaped;

the swing rod is connected to the piston rod, which is horizontally disposed, through a screw;

the piston rod is of a cylindrical shape, opposite ends thereof being mounted with sealing rings, the opposite ends extending into the left and right cylinder bodies, respectively;

the left and right cylinder bodies are each of a cylindrical structure, and the left and right cylinder bodies are mounted at opposite ends of the pump body, respectively; and each of the left and right cylinder bodies is sequentially provided at an outer end thereof with the one-way valve bodies and the cylinder heads, the one-way valve bodies being communicated with an inner cavity of the left and right cylinder bodies, and communicated with external air or compressed air lines through passages in the cylinder heads.

16. The multi-range on-site full-automatic pressure calibration instrument of claim 15, wherein the piston rod forms sealing, through the sealing rings mounted at the opposite ends thereof, at an inner wall of the left and right cylinder bodies; and a swing motion of the swing rod drives the piston rod to reciprocate within the left and right cylinder bodies along the axis.

17. The multi-range on-site full-automatic pressure calibration instrument of claim 16, wherein the outer end of each of the left and right cylinder bodies is mounted with two reversely disposed one-way valve bodies, which are a part of the plurality of one-way valve bodies, such that one of the two reversely disposed one-way valve bodies is communicated with the external air, and the other of the two reversely disposed -one-way valve bodies is communicated with the compressed air line.

18. The multi-range on-site full-automatic pressure calibration instrument of claim 17, wherein the plurality of one-way valve bodies are formed through assembly of a cavity seal body, an elastic arm, a metal pad, and a sealing ring, wherein the elastic arm extends inwardly from the cavity seal body and is coupled with a top end of the metal pad, and a bottom end of the metal pad is fixed with the sealing ring of the plurality of one-way valve bodies.

19. The multi-range on-site full-automatic pressure calibration instrument of claim 15, wherein the pressure standard device is a standard gauge, the standard gauge being a precision digital pressure gauge or a digital pressure calibrator.

20. The multi-range on-site full-automatic pressure calibration instrument of claim 1, wherein the power supply unit is a system powered by an external power source, or a self-power system including a battery.

* * * * *